UNITED STATES PATENT OFFICE.

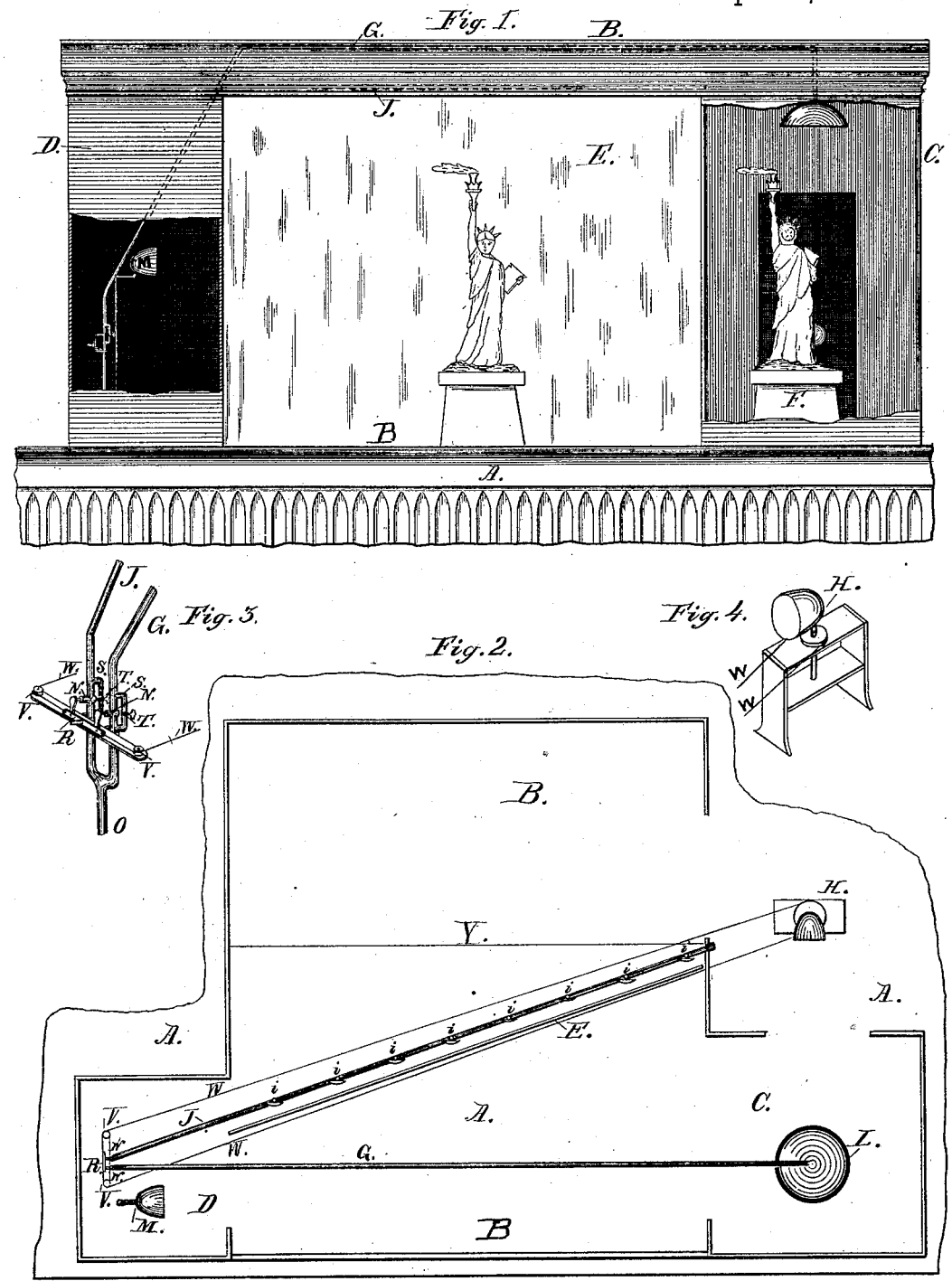

JOHN W. SHERMAN, OF NEW YORK, N. Y.

THEATRICAL APPLIANCE.

SPECIFICATION forming part of Letters Patent No. 296,467, dated April 8, 1884.

Application filed July 30, 1883. (No model.)

*To all whom it may concern:*

Be it known that I, JOHN W. SHERMAN, of the city, county, and State of New York, have invented a new and useful Improvement in Theatrical Appliances; and I do hereby declare that the following is a full and exact description thereof, reference being had to the accompanying drawings, and to the letters of reference marked thereon, making a part of this specification.

My invention relates to an improvement in that class of theatrical appliances for producing illusionary effects, in which a plate of glass dividing the stage, or a portion of it, from the audience is used in connection with reflected lights and illuminated figures.

The object of my invention is to permit the display upon the glass of living figures standing or moving naturally upon the level of the stage at one side, where, concealed from the direct view of the audience, they will be free to go through any movements desired to improve the scenic effect, either singly or in groups, and also to produce startling transformation scenes, dissolving views, and other spectacular displays in connection with suitable theatrical performances enacted upon the stage behind the plate of glass.

It consists in a novel arrangement and combination of lights and reflectors in connection with a plate of glass extending across the stage, or within a cabinet placed thereon, in a vertical plane at such an angle horizontally with the front of the stage, as that its perpendicular surface will reflect to the audience figures or persons placed at one side of the stage out of the direct line of vision of the audience, whereby the reflecting-glass is rendered invisible to the audience, and a powerful light may be easily and instantly directed and concentrated at will, either upon that portion of the stage behind the plate or upon the figures at the side of the stage which it is desired to display by reflection, and also in a novel arrangement of gas-pipes for feeding said lights, and an apparatus for controlling the same, as hereinafter described.

In the accompanying drawings, Figure 1 is a front view of a cabinet placed upon a stage, a portion on each side being broken away to show the arrangement of the lights and position of figures; Fig. 2, a plan view. Fig. 3 is a detached perspective view of the mechanism for manipulating the lights, and Fig. 4 is a detached view of one of the reversible side lights and reflectors.

A is a stage or platform, upon which is placed or erected a cabinet, B, opened in front and constructed with two lateral wings or compartments, C D, closed in front, but which are opened toward the central cabinet. Across the front of the cabinet B is placed a vertical plate of glass, E, Fig. 2, disposed at such an angle with one side of the cabinet horizontally as that the image of a figure F, Fig. 1, placed in the wing or lateral compartment C on that side, will be reflected upon the surface of the glass, and so made visible by reflection to the audience or spectators in front of the stage.

A powerful electric or calcium light, H, having a suitable reflector fixed behind it, is mounted upon a rotating stand on a vertical spindle located at the side of the cabinet in the rear of the compartment C, so that its rays may be thrown at pleasure either upon the figures in the compartment or upon the figures on the stage behind the glass E. A second calcium light and reflector, M, is placed in the opposite wing or compartment D, to project its rays across the stage, in front of the glass E, upon the figures in the compartment C, and a third powerful light, L, produced from gas-burners, is fixed immediately over the compartment C, and fitted with a reflector to direct its rays down upon the figures in said compartment. A row of gas-lights, *i i i*, are also placed at the top of the stage, just above and in the rear of the glass plate E, to extend its entire length, and are fitted with reflectors to illuminate the stage behind the glass E.

The gas-burner at L is supplied by means of a pipe, G, and the jet-lights *i i i* by a pipe, J, (see Fig. 3,) and these pipes are arranged to branch from the main O in the compartment D at a convenient point near to the calcium light M, and are fitted with controlling-cocks N N, placed side by side in the same horizontal plane. These cocks are actuated by cranks which are coupled by a connecting-rod, R, so as to move together, the ports in each being so arranged, however, that when moved together by the connecting-rod the one will open as the other closes, and vice versa. To prevent the entire extinguishment of the lights controlled by either cock when it is closed, a small "by-pass" or branch pipe, S, is made to connect each main pipe from a point below the cock N therein to a point above it, so as to allow a passage of gas through the branch pipe independently of the cock, this independent supply being, however, controlled by a cock, T, in each by-pass. The cocks T T, when opened, will prevent the gas from being entirely cut off, and may be so adjusted as to permit only a slight blue flame at each burner. From each end of the connecting-rod R, coupling the cranks of the main cocks, a small cord or wire, W, is led around suitable guide-pulleys, V V, to a pulley on the spindle of the rotating calcium light and reflector H, and is so adjusted as that when the coupling-rod is moved in the direction to turn on the lights at L, for the purpose of illuminating the side figures in the compartment C, the reflector H will be simultaneously turned to throw the rays of the calcium light also upon said figures, while the movement of the rod R to turn down the gas at L and turn up the gas-jets $i\ i\ i$ will operate to turn the reflector at H toward the stage, to illuminate the objects thereon. While regulating with one hand the lights, controlled as described by the rod R, the operator may with his other hand regulate the calcium light M, as required. The inner surface of the side compartments, C and D, are lined with a lusterless black fabric, to prevent any reflection of light therefrom to the glass.

In the use of my invention the persons or objects whose images are to be reflected from the glass are placed in the side compartment, C, and the actors upon the stage take their places behind the glass at such a distance therefrom—indicated to them by a floor-line or by a gauze curtain, Y, stretched between them and the glass—as that the reflection upon the glass of the objects at D shall appear to the audience to be in the space occupied by the actors, and the reflected images and the persons or objects seen direct shall be undistinguishable the one from the other as to their reality or actual presence in said space. The lights being lit and the small stop-cocks T T adjusted so that when the gas from either pipe G or J is turned off by the larger stop-cock N enough gas will pass through its small secondary pipe S to supply a small blue flame to each burner, and with the calcium lamp H, also properly adjusted with reference to the other lights, as described, if, by a movement of the rod R the jet-lights $i\ i\ i$ are turned up to illuminate the stage, the calcium light H will be automatically turned also toward the stage, and the light at L will burn low, the light M being also turned down. When it is desired to introduce the illusionary display, the operator in the wing C may, by a simple movement of the rod R in the proper direction with one hand, turn the light H from the stage upon the figures in D, and simultaneously turn up the light at L and turn down the jet-lights $i\ i\ i$ above. At the same time he may turn on the light M with the other hand, so that the side figures shall instantly, by means of the combined lights, become clearly reflected from the glass to the audience. This change of lights may be made so suddenly as to produce an apparent instantaneous transformation of the scene or tableaux upon the stage, a view of the side figures being substituted for those upon the stage or the transformation may be gradually produced as a dissolving view.

Having described my invention, what I claim is—

1. The combination, with a theatrical stage or cabinet, a side exhibition-compartment open to the stage but closed at the front, and a vertical plate of glass so fitted or adjusted in front of the stage at a horizontal angle as to face the side compartment, of a light concealed upon the side of the stage opposite to the exhibition-compartment in position to throw its rays across the front of the glass into said compartment, a second concealed light placed overhead in said compartment, and a third concealed light placed in the rear of the compartment, and adapted to be reflected either into said compartment or upon the stage in the rear of the glass plate, all substantially in the manner and for the purpose herein set forth.

2. The combination, with a theatrical stage or cabinet fitted with a glass reflecting-plate, E, and with concealed illuminating-burners L M and $i\ i$ on opposite sides of said plate, of a gas-main, O, to supply said burners, branch pipes J G, connecting the main with the burners, stop-cocks N N in said branch pipes, a coupling-rod, R, connecting the cock-levers, and side pipes, S S, connecting each branch pipe above and below its controlling-cock, substantially in manner and for the purpose herein set forth.

3. The combination, with a gas-main supplying the burners illuminating a vertical glass reflecting-plate upon a theatrical stage, the branch pipes connecting said main with the burner, stop-cocks in said pipes, and a coupling-rod, R, connecting the cock-levers, and with a rotating light and reflector, H, adapted to illuminate either the stage in the rear of the glass or objects placed at the side thereof in front of the plane of the glass, of cords W W, extending from either end of the coupling-rod R, or from the cocks connected thereby, to the device upholding the rotating light, whereby the movement of the cocks in opening and closing shall operate to reverse the position of said light and reflector, substantially in the manner and for the purpose herein set forth.

In testimony whereof I have signed my name to this specification in the presence of two subscribing witnesses.

JOHN W. SHERMAN.

Witnesses:
M. FORBES ROBERTSON,
A. W. STEIGER.